(12) United States Patent
Kakarala et al.

(10) Patent No.: US 7,283,164 B2
(45) Date of Patent: Oct. 16, 2007

(54) METHOD FOR DETECTING AND CORRECTING DEFECTIVE PIXELS IN A DIGITAL IMAGE SENSOR

(75) Inventors: Ramakrishna Kakarala, Sunnyvale, CA (US); Xuemei Zhang, Mountain View, CA (US); Bond Yu-Pong Ying, Corvallis, OR (US); John H. Stanback, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 1150 days.

(21) Appl. No.: 10/246,124

(22) Filed: Sep. 18, 2002

(65) Prior Publication Data

US 2004/0051798 A1    Mar. 18, 2004

(51) Int. Cl.
*H04N 9/64* (2006.01)
*H04N 3/14* (2006.01)

(52) U.S. Cl. ............... 348/246; 348/273; 382/162

(58) Field of Classification Search ........... 348/243, 348/246, 247, 272, 250; 382/162, 250, 167, 382/172

See application file for complete search history.

(56) References Cited

U.S. PATENT DOCUMENTS

| | | | |
|---|---|---|---|
| 5,652,621 A | 7/1997 | Adams, Jr. et al. | 348/272 |
| 6,091,851 A * | 7/2000 | Acharya | 382/167 |
| 6,296,387 B1 | 10/2001 | Guillemaud | |
| 6,299,578 B1 * | 10/2001 | Kurnik et al. | 600/309 |
| 6,724,945 B1 * | 4/2004 | Yen et al. | 382/274 |
| 6,806,902 B1 * | 10/2004 | Donovan | 348/246 |
| 7,015,961 B2 * | 3/2006 | Kakarala | 348/246 |
| 2002/0196354 A1 * | 12/2002 | Chang et al. | 348/246 |

FOREIGN PATENT DOCUMENTS

EP    0341700 A2    5/1989

OTHER PUBLICATIONS

Nicos Herodotou and Anastasios N. Venetsanopoulos; *Colour Image Interpolation for High Resolution Acquisition and Display Devices*; IEEE Transactions on Consumer Electronics, vol. 41, No. 4, Nov. 1995; pp. 1118-1126.

Bo Tao, Ingeborg Tastl, Ted Cooper, Mike Blasgen and Eric Edwards; *Demosaicing using Human Visual Properties and Wavelet Interpolation Filtering*; Proceedings of the IS&T/SID Seventh Color Imaging Conference: Color Science, Systems, and Applications, Scottsdale, Arizona, 1999; pp. 252-256.

(Continued)

*Primary Examiner*—Ngoc-Yen Vu
*Assistant Examiner*—Carramah J Quiett
(74) *Attorney, Agent, or Firm*—RatnerPrestia

(57) ABSTRACT

A bad pixel correction (BPC) algorithm that can be implemented on the image sensor chip is provided for detecting and correcting defective pixels in a digital color image sensor. Gradients of neighboring pixels in at least one other color plane than the color plane of a current pixel and a range of sensor values from neighboring pixels in the same color plane as the current pixel are determined. If the sensor value of the current pixel is outside of the range by a threshold amount that is calculated using one or more of the gradients, the current pixel is determined to be a defective pixel, and replaced using the sensor values of the neighboring pixels in the same color plane.

33 Claims, 8 Drawing Sheets

OTHER PUBLICATIONS

Guy Meynants and Bart Dierickx; *A Circuit for the Correction of Pixel Defects in Image Sensors*; Proceedings of the 24th European Solid-State Circuits Conference, Sep. 22-24, 1998, The Hague, Netherlands; pp. 312-315.

Yap-Peng Tan and Tinku Acharyz; *A Robust Sequential Approach for the Detection of Defective Pixels in an Image Sensor*; Proceedings of the 1999 International Conference on Acoustics, Speech, and Signal Processing, Phoenix, Arizona, Mar. 15-19, 1999; pp. 2239-2242.

Knutsson, Hans et al., "Normalized and Differential Convolution", Computer Vision and Pattern Recognition. 1993, pp. 515-523.

* cited by examiner

METHOD FOR DETECTING AND CORRECTING DEFECTIVE PIXELS IN A DIGITAL IMAGE SENSOR

BACKGROUND OF THE INVENTION

1. Technical Field of the Invention

The present invention relates generally to digital color image sensors, and specifically to image processing of sensor values.

2. Description of Related Art

Electronic image sensors are predominately of two types: CCDs (Charge Coupled Devices) and CMOS—APS (Complimentary Metal Oxide Semiconductor—Active Pixel Sensors). Both types of sensors typically contain an array of photo-detectors (e.g., pixels), arranged in a pattern, that sample color within an image. Each pixel measures the intensity of light within one or more ranges of wavelengths, corresponding to one or more perceived colors.

Despite advances in the manufacturing process, digital image sensors often contain a few defective pixels as a result of noise or fabrication errors, such as impurity contamination. Defective pixels respond inappropriately to the incident light, and therefore produce inaccurate sensor values. Defective pixels are predominantly of three types: stuck high, stuck low or abnormal sensitivity. A stuck high pixel has a very high or near to full scale output, while a stuck low pixel has a very low or near to zero output. An abnormal sensitivity pixel produces a sensor value different from neighboring pixels by more than a certain amount when exposed to the same light conditions.

Thus, a defective pixel can be identified by examining the difference between sensor responses of the defective pixel and its immediate pixel neighbors to the same illumination. Once identified, the sensor value of a defective pixel can be replaced with an estimated sensor value from pixels in the neighborhood of the defective pixel. The process of detecting and correcting defective pixels is referred to as bad pixel correction (BPC). There are a number of algorithms for BPC available in the market today. BPC algorithms exist for both color image sensors and monochrome image sensors. For color image sensors, BPC algorithms typically identify defective pixels by comparing the response of a pixel with neighbors of the same color, even though the neighbors may not be spatially adjacent to the pixel.

For example, one BPC method for color image sensors proposed by Maynants & Diercickx in "A circuit for the correction of pixel defects in image sensor", Proceedings of the 24$^{th}$ European Solid-State Circuits Conference, The Hague, Netherlands, Sep. 22-24, 1998, p. 312-315, which is hereby incorporated by reference, detects bad pixels by comparing the sensor value of a current pixel to sensor value predictions from neighboring pixels of the same color on the same row. However, the Maynants & Diercickx BPC method does not compare pixels in other color planes that are spatially adjacent to the current pixel, and therefore has the drawback of erasing local ridges in the image, where sensor values peak or recess. The Maynants & Diercickx BPC method also does not compare pixels vertically, and therefore has the additional drawback of erasing fine vertical lines.

Another BPC method for color image sensors proposed by Tan & Acharya in "A robust sequential approach for the detection of defective pixels in an image sensor" Proceedings of the 1999 International Conference on Acoustics, Speech and Signal Processing, Phoenix, Ariz., Mar. 15-19, 1999, p. 2239-2242, which is hereby incorporated by reference, builds a bad pixel map by accumulating the result of bad pixel detection over a sequence of images based on a minimum difference between a given pixel and its immediate neighbors of the same color. However, the Tan & Acharya method requires the storage of the bad pixel map in non-volatile memory. Incorporating non-volatile memory into an image sensor or an image processor chip is a significant expense. Furthermore, the Tan & Acharya method also does not compare pixels in other color planes when creating the bad pixel map.

Therefore, what is needed is a bad pixel correction algorithm that effectively and accurately detects and corrects defective pixels using sensor values from other color planes to account for local ridges in an image. In addition, what is needed is an efficient and accurate bad pixel correction algorithm that requires minimal memory and computation, allowing the algorithm to be implemented on the image sensor chip.

SUMMARY OF THE INVENTION

Embodiments of the present invention provide a bad pixel correction (BPC) algorithm for detecting and correcting defective pixels in a digital color image sensor. For a current pixel, gradients from neighboring pixels in at least one other color plane than the color plane of the current pixel are used to determine whether the current pixel is defective. For example, both the gradients and a range of sensor values from neighboring pixels in the same color plane as the current pixel can be determined. If the sensor value of the current pixel is outside of the range by a threshold amount that is calculated using one or more of the gradients, the current pixel is determined to be a defective pixel. The gradients in other color planes provide a more accurate prediction of the sensor value of the current pixel by considering the local roughness in the image (e.g. a textured region vs. a uniform region).

In one embodiment, the range of sensor values for the current pixel includes a maximum sensor value and minimum sensor value of neighboring pixels in the same color plane from at least the current row. If the sensor value of the current pixel is greater than the maximum sensor value or less than the minimum sensor value, and the difference between the sensor value of the current pixel and either the maximum sensor value or the minimum sensor value exceeds a threshold amount calculated using an average gradient among the neighboring pixels, the current pixel is determined to be a defective pixel. For each defective pixel detected, the sensor value of the defective pixel is replaced using the sensor values of the neighboring pixels.

In another embodiment, the range of sensor values includes at least a maximum estimate, minimum estimate and mean estimate calculated using gradients of neighboring pixels in other color planes from different rows than the current pixel. If the sensor value of the current pixel is greater than the maximum estimate or less than the minimum estimate by more than a threshold amount calculated using the mean estimate, the current pixel is determined to be a defective pixel. For each defective pixel detected, the sensor value of the defective pixel is replaced using the sensor values of the neighboring pixels.

Advantageously, using gradients in more than one color plane reduces false bad pixel detection by accounting for local ridges in the image. In addition, false bad detection can be further reduced by using both vertical and diagonal gradients to avoid erasing fine vertical lines. As a further advantage, in some embodiments, the BPC algorithm requires only additions, subtractions, shifts and comparison, all of which are easy to implement in hardware. Therefore, the BPC algorithm can be implemented on the same chip as the sensor, while also being effective in accurately detecting and correcting the defective pixels. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
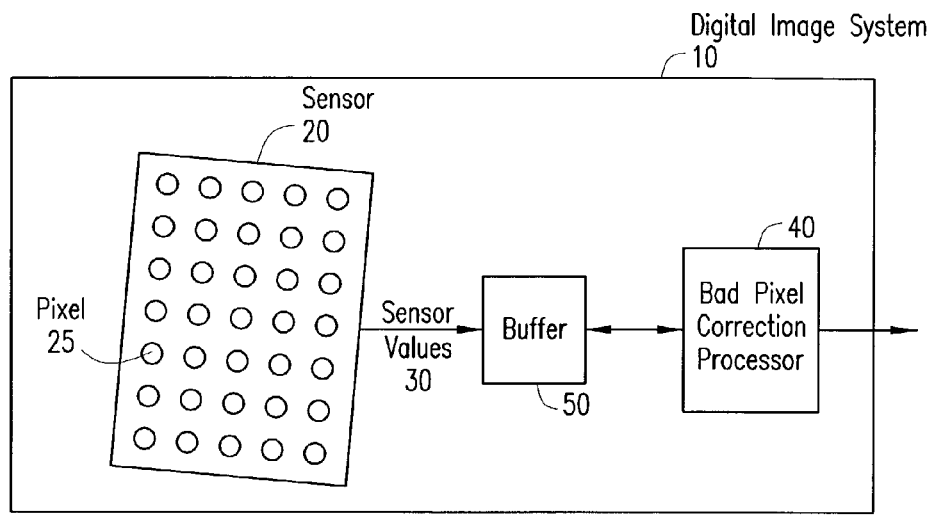
FIG. 1 is a block diagram illustrating a digital image system utilizing a bad pixel correction (BPC) algorithm in accordance with exemplary embodiments of the present invention.

FIG. 1 shows a digital image system 10 implementing a bad pixel correction (BPC) algorithm 40 in accordance with the present invention. The digital image system 10 can be any digital imaging device, such as a digital camera, video camera, medical imaging device, etc. The digital image system 10 can also be a computer system, such as a personal computer or server, having a memory therein for storing image data. Thus, the BPC algorithm 40 can be within a digital imaging device or a part of an image processing software running on a personal computer or server.

The digital image system 10 includes a digital image sensor 20, such as a CMOS sensor chip or a CCD sensor chip, which includes a two-dimensional array of pixels 25 arranged in rows and columns. The digital image sensor 20 may be covered by a color filter array (CFA), such that each pixel 25 senses only one color. For example, the CFA can be the popular Bayer CFA, in which chrominance colors (red and blue) are interspersed amongst a checkerboard pattern of luminance colors (green). The following is an example of the Bayer CFA:

| R | G | R | G | R |
|---|---|---|---|---|
| G | B | G | B | G |
| R | G | R | G | R |
| G | B | G | B | G |
| R | G | R | G | R |

It should be understood that other CFA's may be used instead of the Bayer CFA described herein. It should also be understood that other color spaces, such as yellow, cyan and magenta, can be used instead of the red, blue and green color space discussed herein.

The digital image sensor 20 provides raw sensor values 30 containing the original red, blue and green pixel values to a BPC digital signal processor 40, which applies the BPC algorithm of the present invention to the sensor values 30 in order to detect and correct defective pixels. The sensor values 30 are provided to the digital signal processor 40 blocks at a time. Thus, the sensor values 30 are stored in a buffer 50 until the requisite number of sensor values 30 is present to begin processing. The buffer 50 can be implemented as a storage device external to the BPC processor 40 (e.g., RAM) or within the BPC processor 40 (e.g., internal register, stack or cache). In exemplary embodiments, the BPC algorithm 40 is implemented on the sensor 20 itself. Thus, the buffer 50 and processor 40 can be built into the sensor chip to enable detection and correction of bad pixels on the sensor 20.

The number of sensor values 30 needed to begin processing depends on the type of processing. For example, the sensor values 30 are typically read off the sensor 20 one row at a time. For the process of detecting and correcting defective pixels to begin, at least a portion of the sensor values 30 for one row of pixels 25 are stored within the buffer 50. In addition, since most digital cameras take multiple images to ensure the exposure is correct before selecting the image to permanently store, one or more images may be stored in the buffer 50 at a time.

The corrected sensor values 30 are used in subsequent processing (not shown), such as demosaicing of the sensor values 30 to interpolate red, green and blue color values at each pixel 25 location. The interpolated color planes may further be compressed using a compression method (not shown), such as the JPEG standard, prior to being output to an output device (not shown), such as a video screen, computer screen or printer.

Figure 2:
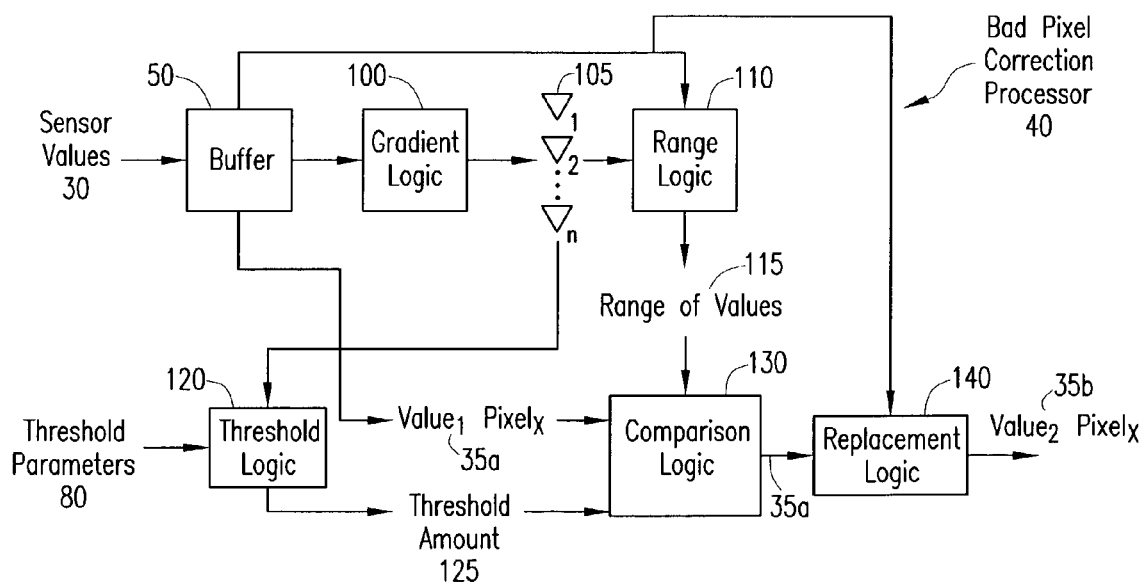
FIG. 2 is a block diagram illustrating exemplary logic for implementing the BPC algorithm in accordance with exemplary embodiments of the present invention.

The BPC digital signal processor 40 detects and corrects defective pixels 25 in each image stored in the buffer 50 according to the BPC algorithm shown in FIG. 2. The BPC algorithm is based on the concept of a "gradient anomaly."

Unlike normal pixels, sensor values from defective pixels are not rationally related to the intensity of light passing through the optics of a lens. In other words, since the optics of a lens imposes a degree of smoothness to the sensor values, any sensor value produced by a defective pixel will be outside of an expected range of values that is dictated by the smoothness (e.g., local roughness) of a particular region of the image. Hence, defective pixel gradients are much sharper than predicted by the neighboring pixel values. Therefore, defective pixels can be detected by identifying anomalous gradients.

The following is an explanation of a gradient in a color plane. Since a color image is a mapping from a 2-dimensional (2-D) domain to a 3-dimensional (3-D) space, i.e., the color space, each component of the color image may be viewed as a function defined on the (x, y) domain, i.e., R(x, y), G(x, y), B(x, y). The gradient in a color plane refers to the degree of change at a pixel location for a particular color plane. For example, the gradient $\nabla$ can be expressed as:

$$\nabla R = \frac{\partial R}{\partial x}, \frac{\partial R}{\partial y}, \ldots, \nabla B = \frac{\partial B}{\partial x}, \frac{\partial B}{\partial y}, \ldots, \nabla G = \frac{\partial G}{\partial x}, \frac{\partial G}{\partial y}, \ldots$$

Therefore, the gradient can be defined as the horizontal, vertical and/or diagonal gradient in a color plane.

For sensors with a color filter mosaic pattern, the local intensity gradients are similar for pixels in different color planes. With a CFA, pixels are usually surrounded by pixels of different colors. Therefore, analyzing the gradients in other color planes, in addition to or instead of analyzing the gradients of the same color plane, can provide a more accurate assessment of whether there are any gradient anomalies indicating that the current pixel is defective.

The BPC algorithm of the present invention uses the gradients in color planes other than the color plane of the current pixel to detect bad pixels, thereby improving the accuracy of bad pixel detection by taking into account the local roughness in the region around the current pixel. In addition, the BPC algorithm of the present invention avoids the use of multiplication or division operations other than by powers of two (which are easily implemented using shift operations) and uses memory (buffer 50) only to store the minimum number of raw sensor values 30 needed to perform the algorithm, thereby enabling the BPC algorithm to be implemented on the sensor chip itself.

In implementation, as shown in FIG. 2, the BPC algorithm 40 takes as input the raw sensor values 30 provided by the buffer 50. Gradient logic 100 within the BPC processor 40 determines gradients 105 from the raw sensor values 30 of neighboring pixels in at least one additional color plane. It should be understood that as used herein, the term "logic" refers to the hardware, software and/or firmware required to perform the function of the logic. For example, assume the following raw sensor values 30 are supplied to the gradient logic 100:

$B_1 \ G_{y1} \ B_2$ $G_{x1} \ R_1 \ G_{x2}$ $B_3 \ G_{y2} \ B_4$

To determine the blue gradients 105 in the region, the horizontal blue derivatives, vertical blue derivatives and diagonal blue derivatives can be calculated as follows: $B_2-B_1$ and $B_4-B_3$ (horizontal); $B_4-B_2$ and $B_3-B_1$ (vertical); and $B_4-B_1$ (left diagonal) and $B_3-B_2$ (right diagonal). The red gradients 105 and green gradients 105 can also be calculated in a similar manner. However, for purposes of this invention, the green values are separated into two different color planes (one for green pixels with horizontal red neighbors and another for green pixels with horizontal blue neighbors) due to possible discrepancies in green values in each of the green color planes caused by improper filter placement.

Using the above sensor values, if $R_1$ is the current pixel under review, the gradient logic 100 can calculate one or more blue gradients 105 (horizontal, vertical and/or diagonal) and/or green gradients 105 (horizontal, vertical and/or diagonal) from neighboring blue and green pixels surrounding $R_1$. In addition, the gradient logic 100 can also calculate one or more red gradients 105 (horizontal, vertical and/or diagonal) from $R_1$ and neighboring red pixels surrounding $R_1$.

Either the gradients 105 or the raw sensor values 30, depending on the implementation (as discussed below in connection with FIGS. 5 and 10), are provided to range logic 110 to determine a range of sensor values 115 from neighboring pixels. For example, in one embodiment, the range of sensor values 115 for the current pixel can include a maximum sensor value 30 and minimum sensor value 30 of neighboring pixels in the same color plane from at least the current row. In another embodiment, the range of sensor values 115 can include a maximum estimate and minimum estimate calculated using the gradients 105 of neighboring pixels in other color planes from different rows than the current pixel and sensor values 30 of neighboring pixels in the same color plane.

The gradients 105 are further provided to threshold logic 120 to compute a threshold amount 125 based upon the gradients 105 and one or more threshold parameters 80. For example, in one embodiment, the threshold amount 125 is calculated using an average gradient 105 among the neighboring pixels. In another embodiment, the threshold amount 125 is calculated using a mean estimate that is computed using the gradients 105 of neighboring pixels in other color planes from different rows than the current pixel and sensor values 30 of neighboring pixels in the same color plane. The threshold parameters 80 can include, for example, one or more variable parameters and/or one or more fixed parameters that are chosen to optimize the ratio of false defective pixel detection to true defective pixel detection.

The threshold amount 125, the range of values 115 and the sensor value 35a of the current pixel (e.g., Value$_1$Pixel$_x$) are provided to comparison logic 130 to determine whether the current pixel is a defective pixel. For example, in one embodiment, if the sensor value 35a of the current pixel is greater than the maximum sensor value or less than the minimum sensor value (outside the range of values 115), and the difference between the sensor value 35a of the current pixel and either the maximum sensor value or the minimum sensor value exceeds the threshold amount 125 calculated using an average gradient 105 among the neighboring pixels, the current pixel is determined to be a defective pixel. In another embodiment, if the sensor value 35a of the current pixel is greater than the maximum estimate or less than the minimum estimate (outside of the range of values 115) by more than the threshold amount 125 calculated using the mean estimate, the current pixel is determined to be a defective pixel.

For each defective pixel detected, replacement logic 140 replaces the sensor value 35a of the defective pixel with a replacement value 35b (e.g., Value$_2$Pixel$_x$) calculated using the sensor values 30 of the neighboring pixels. For example, in one embodiment, the replacement value 35b can be the median sensor value 30 of the neighboring pixels of the same color. In another embodiment, the replacement value 35b can be the mean estimate calculated using the gradients 105 of neighboring pixels in other color planes from different rows than the current pixel and sensor values 30 of neighboring pixels in the same color plane.

Figure 3:
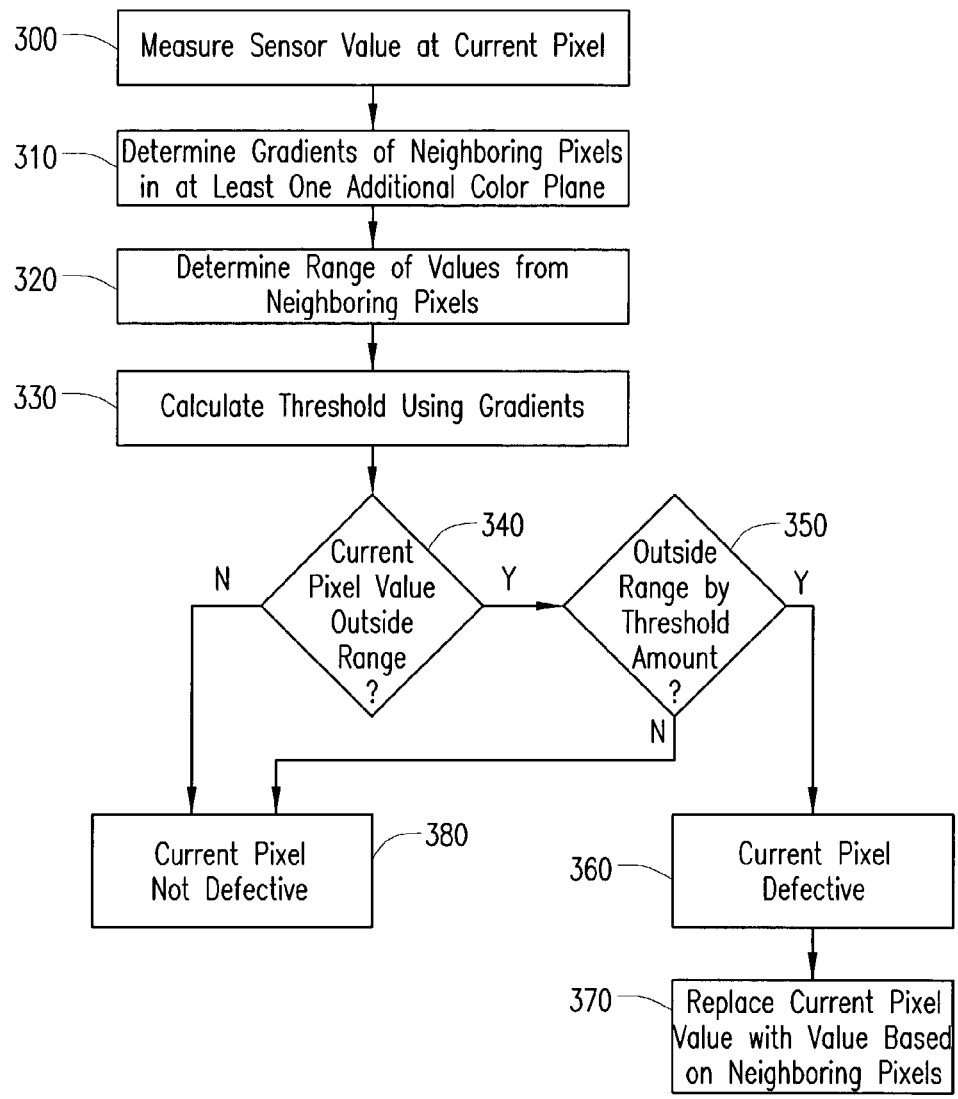
FIG. 3 is a flow chart illustrating exemplary steps for performing the BPC algorithm illustrated in FIG. 2.

Exemplary steps within the BPC algorithm are shown in FIG. 3. Initially, the sensor value at the current pixel location and neighboring pixel locations are measured at the sensor (step 300) and provided to the digital signal processor to determine whether the current pixel is a defective pixel. The gradients of neighboring pixels in at least one additional color plane are calculated (step 310), along with a range of values computed from neighboring pixel values (step 320). The gradients are used to calculate a threshold amount (step 330) over which the current pixel is considered to be defective. For example, if the sensor value of the current pixel is not only outside of the range of values (step 340), but is outside of the range of values by more than the threshold amount (step 350), the current pixel is defective (step 360), and the sensor value of the current pixel is replaced with a value based on neighboring pixel values in the same color plane (step 370). However, if the sensor value is either not outside of the range of values (step 340) or not outside the range of values by more than the threshold amount (step 350), the current pixel is not defective (step 380) and no changes are made to the sensor value of the current pixel.

Figure 4:
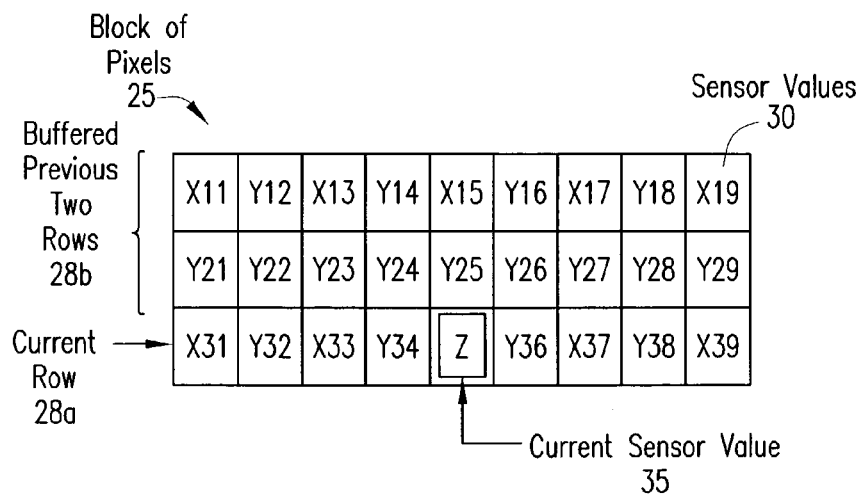
FIG. 4 illustrates sample raw sensor values obtained from a 3×9 block of pixels that can be used in embodiments of the BPC algorithm of the present invention.

An example of raw sensor values 30 stored within the buffer obtained from a 3×9 block of pixels 25 that can be used in embodiments of the BPC algorithm of the present invention are shown in FIG. 4. The sensor value 35 of the current pixel under review is labeled "Z", the sensor values 30 obtained from pixels that are the same color as the current pixel are labeled "Xn", and the sensor values 30 obtained from pixels of different colors are labeled "Yn". In the example shown in FIG. 4, both the current row 28a and the two previous rows 28b of sensor values are stored in the buffer and processed to determine whether the current pixel "Z" is a defective pixel. The sensor values 30 of the two previous rows 28b are the minimum necessary to calculate vertical and diagonal gradients for a Bayer color filter mosaic pattern (since colors are only repeated every two rows).

Figure 5A:
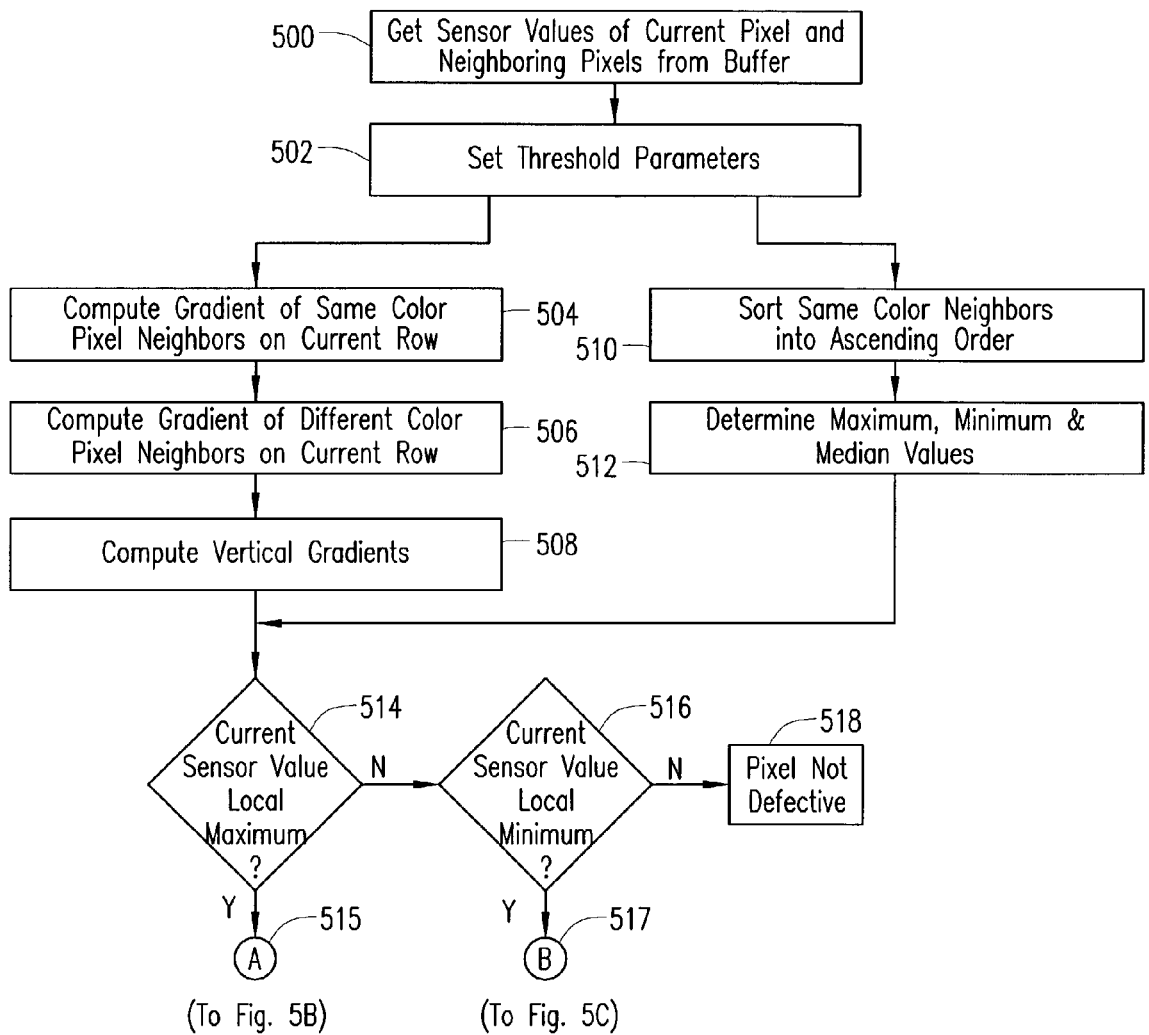
FIGS. 5A-5C are flow charts illustrating exemplary steps for performing the BPC algorithm on the 3×9 block of pixels shown in FIG. 4, in accordance with one embodiment of the present invention.
Figure 5B:
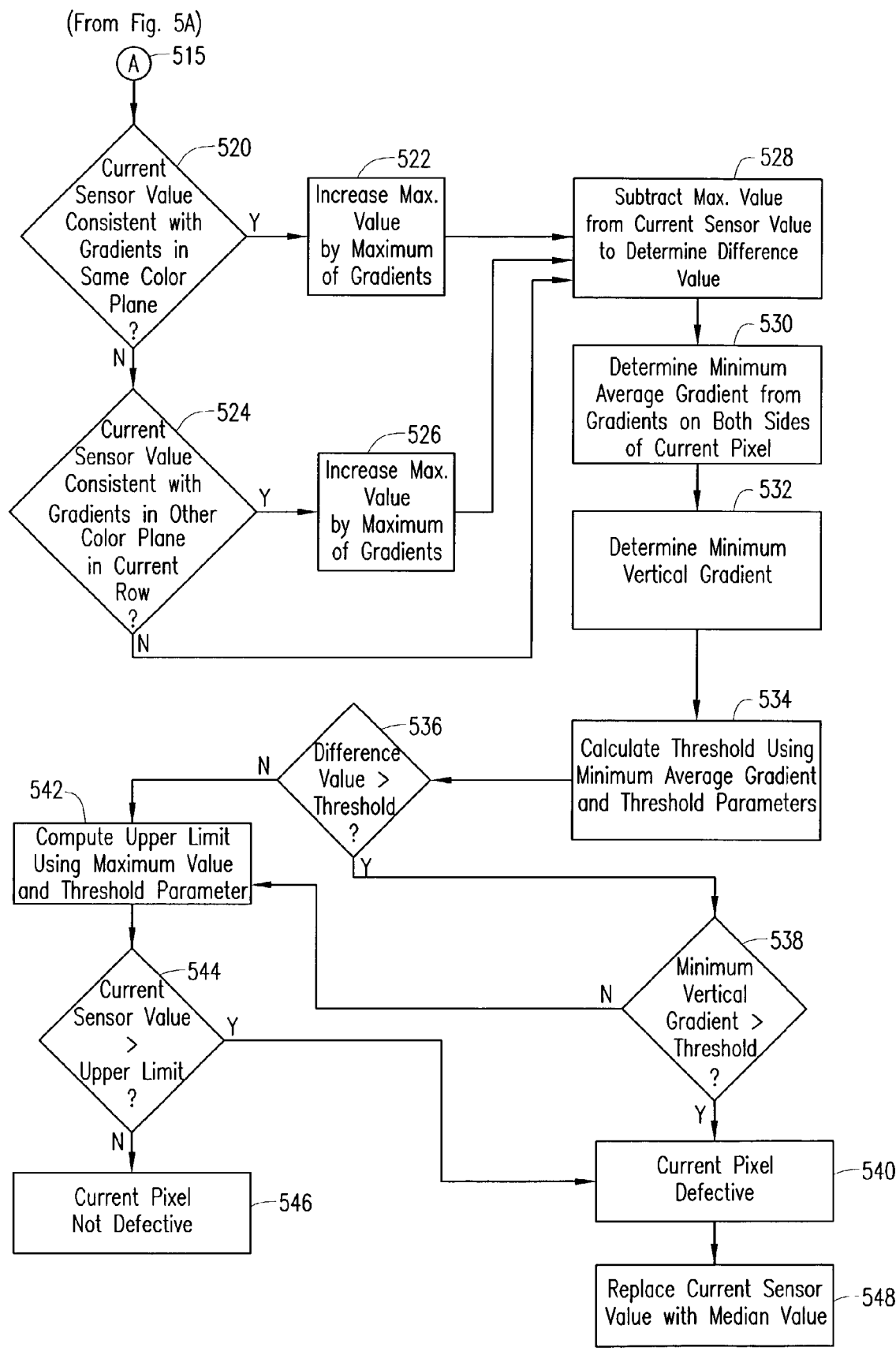
Figure 5C:
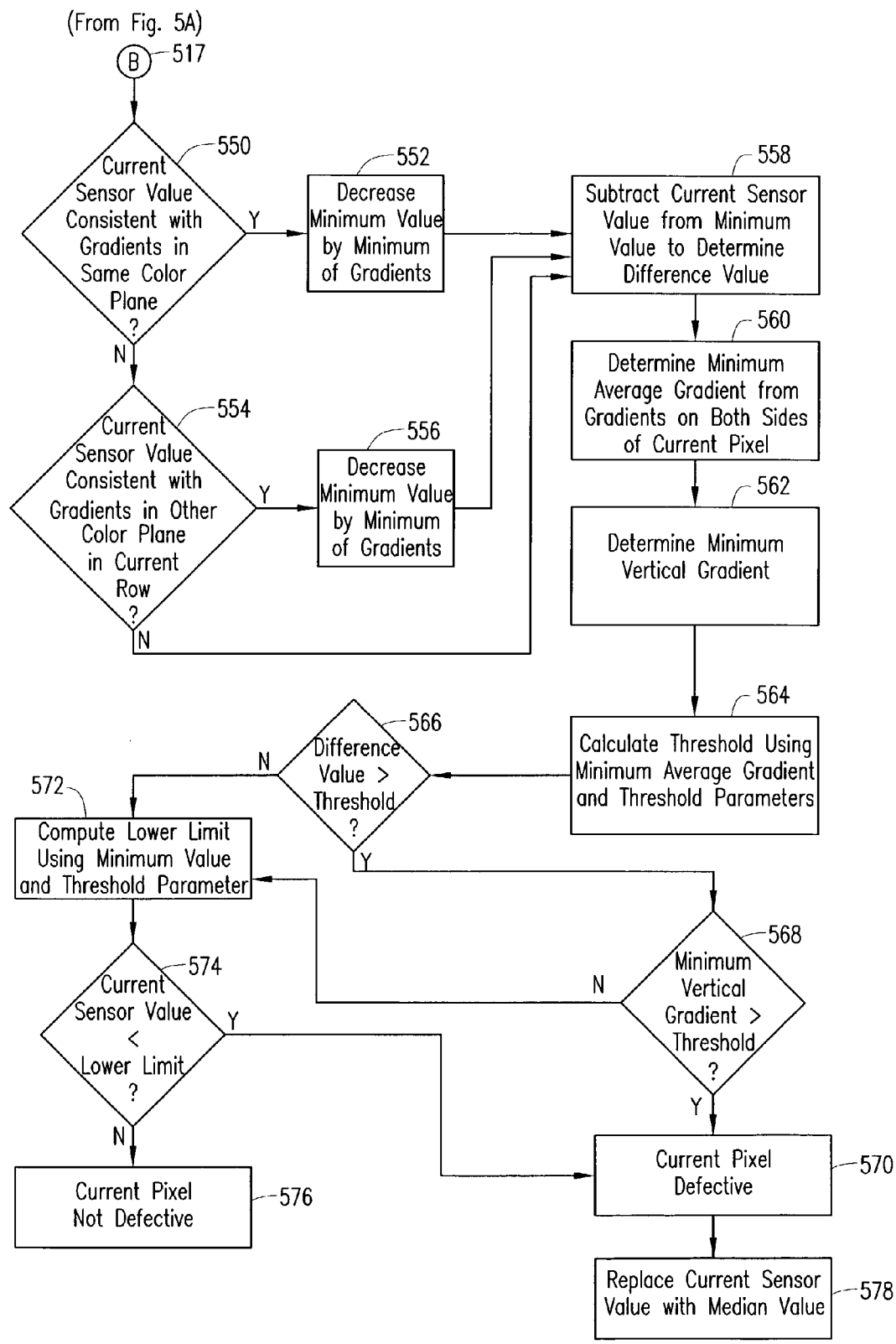

The 3×9 block of pixels 25 in FIG. 4 can be used to illustrate a sample implementation of the BPC algorithm shown in the exemplary steps of FIGS. 5A-5C. Upon retrieving the requisite number of neighboring sensor values from the buffer for analyzing the sensor value 35 of the current pixel "Z" (step 500), one or more threshold parameters can be set (step 502) to reduce the number of false bad pixel detections. For example, the threshold parameters can include one or more fixed parameters that are pre-set prior to performing the analysis of the current pixel and/or one or more variable parameters that can be modified for the current analysis, if necessary.

From the retrieved neighboring sensor values 30, one or more gradients can be computed from same color pixel neighbors on the current row 28a (step 504), and one or more gradients can be computed from different color pixel neighbor on the current row 28a (step 506). For example, using the 3×9 block of pixels 25 in FIG. 4, the gradients can include:

Same Color Gradients $d\text{Color}(1) = X33 - X31$;

$d\text{Color}(2) = Z - X33$;

$d\text{Color}(3) = X37 - Z$;

$d\text{Color}(4) = X39 - X37$;

Different Color Gradients $d\text{OtherColor}(1) = Y34 - Y32$;

$d\text{OtherColor}(2) = Y38 - Y36$.

In addition, one or more vertical gradients in the same color plane as the current pixel from different rows 28b can also be computed (step 508) as follows:

Vertical Gradients $d\text{Vert} = Z - X15$;

$d\text{VertDiagLeft} = Z - X13$;

$d\text{VertDiagRight} = Z - X17$.

The use of vertical gradients enables the detection of fine vertical lines that may account for the difference in sensor values 30 between the current pixel ("Z") and neighboring pixels (Xn, Yn) on the current row 28a. It should be understood that in other embodiments, five lines can be stored in the buffer (two above the current row and two below the current row) to provide additional vertical gradients directly below the current pixel, diagonally to the left and below the current pixel and diagonally right and below the current pixel. These additional below vertical gradients can be used in the same manner as the above vertical gradients, as described below.

At the same time, a range of sensor values for the current pixel ("Z") can be formulated by sorting the neighboring sensor values 30 in the same color plane as the current pixel into ascending order (step 510) and determining a maximum sensor value, minimum sensor value and median sensor value from the sensor values 30 from neighboring pixels in the current row 28a and at least the two previous rows 28b (step 512). For example, using the 3×9 block of pixels 25 in FIG. 4, the maximum, minimum and median sensor values can be represented as:

minimum=minimum($X33, X15, X37$);

median=median($X33, X15, X37$);

maximum=maximum($X33, X15, X37$).

After the range of sensor values (minimum and maximum) for the current pixel is determined, the BPC algorithm checks whether the current sensor value 35 is a local maximum (step 514) or local minimum (step 516). If the current pixel is neither a local maximum (brighter than the same color neighboring pixels) or a local minimum (darker than the same color neighboring pixels), the current pixel ("Z") is not a defective pixel (step 518). For example, the current sensor value 35 can be labeled a local maximum if:

($d\text{Color}(2)>0$) AND ($d\text{Color}(3)<0$) AND ($d\text{Vert}>0$).

Thus, if the same color gradients nearest to the current pixel ("Z") indicate that the current sensor value 35 is greater than the nearest same color pixel neighbors on the current row 28a, and the vertical gradient indicates that the current sensor value 35 is greater than the same color pixel neighbor directly above the current pixel, the current sensor value 35 is a local maximum. Likewise, the current sensor value 35 can be labeled a local minimum if:

(*d*Color(2)<0) AND (*d*Color(3)>0) AND (*d*Vert<0).

Thus, if the same color gradients nearest to the current pixel ("Z") indicate that the current pixel sensor value 35 is less than the nearest same color pixel neighbors on the current row 28*a*, and the vertical gradient indicates that the current sensor value 35 is less than the same color pixel neighbor directly above the current pixel ("Z"), the current sensor value 35 is a local minimum.

Local maximums and local minimums are processed slightly differently, and therefore, each will be discussed separately with reference to FIGS. 5B and 5C, respectively. If the current pixel is a local maximum (step 515), in FIG. 5B, a check is made of whether the sensor value 35 of the current pixel ("Z") is consistent with gradients in the same color plane (step 520). For example, using FIG. 4, the current sensor value 35 is considered to be consistent with gradients in the same color plane if:

(*d*Color(1)>=0) AND (*d*Color(4)<=0) AND (*d*Vert-
    DiagLeft>=0) AND (*d*VertDiagRight>=0).

Therefore, if the gradients for neighboring pixels outside of the immediate neighbors indicate that the current pixel is on a local ridge, such that, with increasing position along the row, the sensor values 30 on the left of the current pixel ("Z") are increasing and the sensor values 30 on the right of the current pixel ("Z") are decreasing, the current sensor value 35 is considered to be consistent with the gradients in the same color plane. In this case, the maximum value in the range of values can be increased by the maximum of the gradients on either side of the current pixel (step 522). For example, the maximum value can be increased as follows:

maximum=maximum+max(*d*Color(1),−*d*Color(4)).

Increasing the maximum value in the range of sensor values accounts for the character of the region (e.g., whether the current pixel is on a local ridge), and therefore, reduces the likelihood of false defective pixel detection.

As a further check of whether the current pixel is on a local ridge, if the current sensor value 35 is not consistent with gradients in the same color plane, a check can be made of whether the sensor value 35 of the current pixel ("Z") is consistent with gradients in other color planes (step 524). For example, using FIG. 4, the current sensor value 35 is considered to be consistent with gradients in other color planes if:

(*d*OtherColor(1)>=0) AND (*d*OtherColor(2)<=0).

Therefore, if the gradients for neighboring pixels in other color planes indicate that the current pixel is on a local ridge, such that, with increasing position along the row, the sensor values 30 in another color plane on the left of the current pixel ("Z") are increasing and the sensor values 30 in the other color plane on the right of the current pixel ("Z") are decreasing, the current sensor value 35 is considered to be consistent with the gradients in other color planes.

In this case, the maximum value in the range of values can be increased by the maximum of the gradients on either side of the current pixel ("Z") (step 526). For example, the maximum value can be increased as follows:

maximum=maximum+max(*d*OtherColor(1),−*d*Other-
    Color(2)).

The amount of increase of the maximum value depends upon how steep the local ridge actually is. For example, if the gradients in the current row 28*a* of the same color plane or another color plane are high, indicating that the region is a textured region (i.e., there is a significant change in light intensity within the region), the maximum value will increase significantly. However, if the gradients in the current row 28*a* of the same color plane or another color plane are low, indicating that the region is a uniform region (i.e., the light intensity in the region is changing only slightly), the maximum value will increase only slightly. If the current sensor value 35 is not consistent with the gradients in the current row 28*a* of the same color plane or another color plane, the maximum value is not increased.

Once the maximum value is adjusted (depending on whether the current pixel is on a local ridge), the maximum value is subtracted from the sensor value 35 of the current pixel ("Z") (step 528) to determine how far above the maximum value the current sensor value 35 is. For example, a difference value (d) can be calculated as follows:

*d*=Z−maximum.

The difference value provides an indication of how skewed the current sensor value 35 is in comparison with neighboring sensor values. However, even in the case of large difference values, the current sensor value 35 may still be the result of a normal pixel, depending on the local roughness and the presence of any vertical lines.

Therefore, a check is made of whether the difference value can be predicted by the local roughness before labeling the pixel ("Z") a defective pixel. To determine whether the difference value can be predicted by the local roughness, the average absolute values of the gradients on both sides of the current pixel ("Z") on the same row 28*a* are computed, and the smaller average absolute value is used as a comparison with the difference value (d) (step 530). Thus, the smallest average gradient (v) can be calculated as follows:

v=min((abs(*d*Color(1))+abs(*d*OtherColor(1)))/2, (abs
    (*d*Color(4))+*abs*(*d*OtherColor(2)))/2).

To avoid filtering out fine vertical or diagonal lines, the smallest absolute value of the vertical gradients (dVertmin) is also computed (step 532), as follows:

*d*Vertmin=min(abs(*d*Vert), abs(*d*VertDiagLeft), abs
    (*d*VertDiagRight))

It should be noted that the gradients can be weighted according to orientation when determining the smallest average gradient and the smallest vertical gradient to account for variations in the sensor values.

If the difference value (d) is sufficiently greater than what the neighborhood dictates, the current pixel ("Z") is determined to be a defective pixel. The neighborhood is defined by the smallest average gradient (v). The amount over the smallest average gradient (v) allowed before considering the pixel ("Z") defective is defined using one or more threshold parameters (step 534). Thus, if the difference value (d) of the current pixel ("Z") exceeds a threshold amount calculated using the smallest average gradient (v) and one or more threshold parameters (step 536), and if the smallest vertical gradient also exceeds that threshold amount (step 538), the current pixel ("Z") is determined to be a defective pixel (step 540).

The smallest vertical gradient is also compared to the threshold amount to ensure that the sensor value 35 of the current pixel ("Z") does not represent a vertical or diagonal line. If the sensor value 35 of the current pixel ("Z") did represent a vertical or diagonal line, one or more of the vertical gradients would be relatively small, since the sensor values of the current pixel and a vertical or diagonal pixel would be close. However, if the sensor value 35 of the current pixel ("Z") did not represent a vertical or diagonal line, even the smallest of the vertical gradients would be large if the current pixel ("Z") were defective.

The threshold parameters can include one or more variable parameters and/or one or more fixed parameters that are chosen to optimize the ratio of false defective pixel detection to true defective pixel detection. For example, the threshold parameters can include a scale factor, multiplied by the smallest average gradient (v), that varies depending upon light conditions, local sensor values, sensor type, etc. The threshold parameters can further include a pedestal that is added to the smallest average gradient (v) to increase the amount over which the difference value (d) is considered to be representative of a defective pixel. The pedestal can be pre-configured or variable depending on the light conditions, local sensor values, type of sensor, etc. The threshold parameters can be set during the manufacturing process, by an operator of the digital image system or using a table of values for the parameters based on light conditions, etc. For example, the threshold parameters can be set based on the auto exposure system of the camera. In low light conditions, the auto exposure system opens the shutter for a longer period of time than in normal or bright light conditions in order to increase the low sensor values. Thus, the length of time that the auto exposure system opens the shutter can determine the threshold parameters used during the BPC process.

Therefore, the current pixel ("Z") cannot be predicted by the neighborhood, and is considered defective, if:

$(d > (v * \text{scale\_factor} + \text{pedestal}))$ AND $(d\text{Vert}\min > (v * \text{scale\_factor} + \text{pedestal}))$.

Exemplary numbers for the scale factor and pedestal in this embodiment are: scale factor of 2 and pedestal of 8. If the sensor value 35 of the current pixel ("Z") is below the threshold amount and/or the smallest vertical gradient is below the threshold amount, one final check is made of the sensor value 35 itself to ensure that sensor values that are significantly greater than expected are labeled defective even if the sensor value can be predicted by the neighborhood (using one or both of the equations above). Therefore, an upper limit is calculated using the maximum value and a threshold parameter (step 542), and if the sensor value 35 of the current pixel ("Z") is above the upper limit (step 544), the current pixel ("Z") is considered defective (step 540). The equation for determining if the current pixel is defective based upon a threshold parameter (referred to as an outlier distance) is as follows:

$Z > \text{maximum} + \text{outlier\_distance}$.

An exemplary number for the outlier distance is 64. If the sensor value 35 can be predicted by the neighborhood and is not above an outlier distance, the current pixel ("Z") is not defective (step 546). However, if the current pixel ("Z") is determined to be defective (step 540), the sensor value 35 of the current pixel ("Z") is replaced with a value based upon neighboring sensor values 30 (step 548). For example, the current sensor value 35 can be replaced with the median value of the surrounding sensor values 30. However, it should be understood that other replacement values can be used, such as a bilinearly interpolated value or pixel replicated (nearest neighbor) value.

If the sensor value 35 of the current pixel ("Z") is a local minimum (step 517), in FIG. 5C, a check is made of whether the sensor value 35 of the current pixel ("Z") is consistent with gradients in the same color plane (step 550). For example, using FIG. 4, the current sensor value 35 is considered to be consistent with gradients in the same color plane if:

$(d\text{Color}(1) <= 0)$ AND $(d\text{Color}(4) >= 0)$ AND $(d\text{Vert-}\allowbreak\text{Diag}\text{Left} <= 0)$ AND $(d\text{VertDiag}\text{Right} <= 0)$.

Therefore, if the gradients for neighboring pixels outside of the immediate neighbors indicate that the current pixel is on a local ridge, such that, with increasing position along the row, the sensor values 30 on the left of the current pixel ("Z") are decreasing and the sensor values 30 on the right of the current pixel ("Z") are increasing, the current pixel sensor value 30 is considered to be consistent with the gradients in the same color plane. In this case, the minimum value in the range of values can be decreased by the minimum of the gradients on either side of the current pixel ("Z") (step 552). For example, the minimum value can be decreased as follows:

$\text{minimum} = \text{minimum} + \min(d\text{Color}(1), -d\text{Color}(4))$.

It should be noted that the gradient dColor(1) is negative and the gradient dColor(4) is positive, so adding the gradients as shown above to the minimum value decreases the minimum value. Decreasing the minimum value in the range of sensor values accounts for the character of the local roughness, and therefore, reduces the likelihood of false defective pixel detection.

As a further check of whether the current pixel lies on a local ridge, if the current sensor value 35 is not consistent with gradients in the same color plane, a check can be made of whether the sensor value 35 of the current pixel ("Z") is consistent with gradients in other color planes (step 554). For example, using FIG. 4, the current sensor value 35 is considered to be consistent with gradients in other color planes if:

$(d\text{OtherColor}(1) <= 0)$ AND $(d\text{OtherColor}(2) >= 0)$.

Therefore, if the gradients for neighboring pixels in other color planes indicate that the current pixel is on a local ridge, such that, with increasing position along row, the sensor values 30 in another color plane on the left of the current pixel ("Z") are decreasing and the sensor values 30 in the other color plane on the right of the current pixel ("Z") are increasing, the current sensor value 35 is considered to be consistent with the gradients in other color planes. In this case, the minimum value in the range of values can be decreased by the minimum of the gradients on either side of the current pixel ("Z") (step 556). For example, the minimum value can be decreased as follows:

$\text{minimum} = \text{minimum} + \min(d\text{OtherColor}(1), -d\text{Other-}\allowbreak\text{Color}(2))$.

Again, the gradient dOtherColor (1) is negative and the gradient dOtherColor(2) is positive, so adding either of the gradients, as shown above, to the minimum value decreases the minimum value. The amount of decrease of the minimum value depends upon how steep the local ridge actually is. For example, if the gradients in the current row 28a of the same color plane or another color plane are high, indicating that the region is a textured region (i.e., there is a significant change in light intensity within the region), the minimum value will go down significantly. However, if the gradients in the current row 28a of the same color plane or another color plane are low, indicating that the region is a uniform region (i.e., the light intensity in the region is changing only slightly), the minimum value will decrease only slightly. If the current sensor value 35 is not consistent with the gradients in the current row 28a of the same color plane or another color plane, the minimum value is not decreased.

Once the minimum value is adjusted (depending on whether the current pixel lies on a local ridge), the sensor value 35 of the current pixel ("Z") is subtracted from the minimum value (step 558) to determine how far below the minimum value the current sensor value 35 is. For example, a difference value (d) can be calculated as follows:

$$d = minimum - Z.$$

The difference value provides an indication of how skewed the current sensor value 35 is in comparison with neighboring sensor values. However, even in the case of large difference values, the current sensor value 35 may still be the result of a normal pixel, depending on the local roughness and the presence of any vertical lines.

Therefore, as in the case where the current sensor value 35 is a local maximum, a check is made of whether the difference value (d) can be predicted by the local roughness before labeling the pixel ("Z") a defective pixel by using the smallest average gradient (v) on either side of the current pixel ("Z") as a comparison with the difference value (d) (step 560). To avoid filtering out fine vertical or diagonal lines, the smallest absolute value of the vertical gradients (dVertmin) is also computed (step 562), as discussed above for the local maximum case.

If the difference value (d) is sufficiently greater than what the neighborhood dictates, the current pixel ("Z") is determined to be a defective pixel. A comparison is made for the local minimum case similar to that of the local maximum case to determine whether the difference value (d) of the current pixel ("Z") exceeds a threshold amount calculated using the smallest average gradient (v) and one or more threshold parameters (steps 564 and 566). If so, and if the smallest vertical gradient also exceeds that threshold amount (step 568), the current pixel ("Z") is determined to be a defective pixel (step 570).

Therefore, as in the local maximum case, the current pixel ("Z") cannot be predicted by the neighborhood, and is considered defective, if:

$$(d > (v*scale\_factor + pedestal)) \text{ AND } (dVert \min > (v*scale\_factor + pedestal)).$$

If the sensor value 35 of the current pixel ("Z") is below the threshold amount and/or the smallest vertical gradient is below the threshold amount, one final check is made of the sensor value 35 itself to ensure that sensor values that are significantly less than expected are labeled defective even if the sensor value can be predicted by the neighborhood (using one or both of the equations above). Therefore, a lower limit is calculated using the minimum value and a threshold parameter (step 572), and if the sensor value 35 of the current pixel ("Z") is below the lower limit (step 574), the current pixel ("Z") is considered defective (step 570). The equation for determining if the current pixel ("Z") is defective based upon a threshold parameter (referred to as an outlier distance) is as follows:

$$Z < minimum - outlier\_distance.$$

If the current sensor value 35 can be predicted by the neighborhood and is not below an outlier distance (step 574), the current pixel ("Z") is not defective (step 576). However, if the current pixel ("Z") is determined to be defective (step 570), the sensor value 35 of the current pixel ("Z") is replaced with a value based upon neighboring sensor values 30 (step 578). For example, the current sensor value 35 can be replaced with the median value of the surrounding sensor values 30. However, it should be understood that other replacements values can be used, such as a bilinearly interpolated value or nearest neighbor value.

Figure 6:
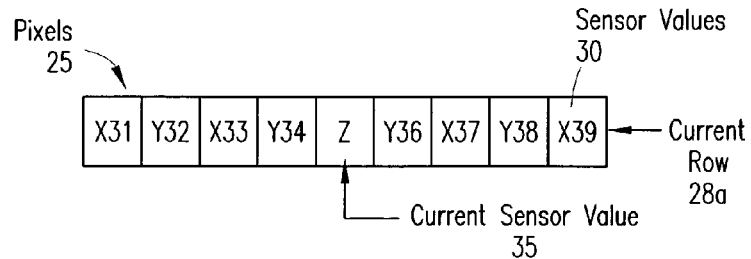
FIG. 6 illustrates a sample of raw sensor values obtained from a single row of pixels that can be used in embodiments of the BPC algorithm of the present invention.

In other embodiments, to reduce the number of rows stored within the buffer 50 for processing, the vertical and diagonal gradients are not employed in the determination of whether the current pixel is defective. Therefore, instead of storing three or more rows within the buffer, only the current row 28a is stored within the buffer, as shown in FIG. 6, for use in such embodiments of the BPC algorithm of the present invention. As in FIG. 4, the sensor value 35 in FIG. 6 of the current pixel under review is labeled "Z", the sensor values 30 obtained from pixels that are the same color as the current pixel are labeled "Xn", and the sensor values 30 obtained from pixels of different colors are labeled "Yn".

Figure 7:
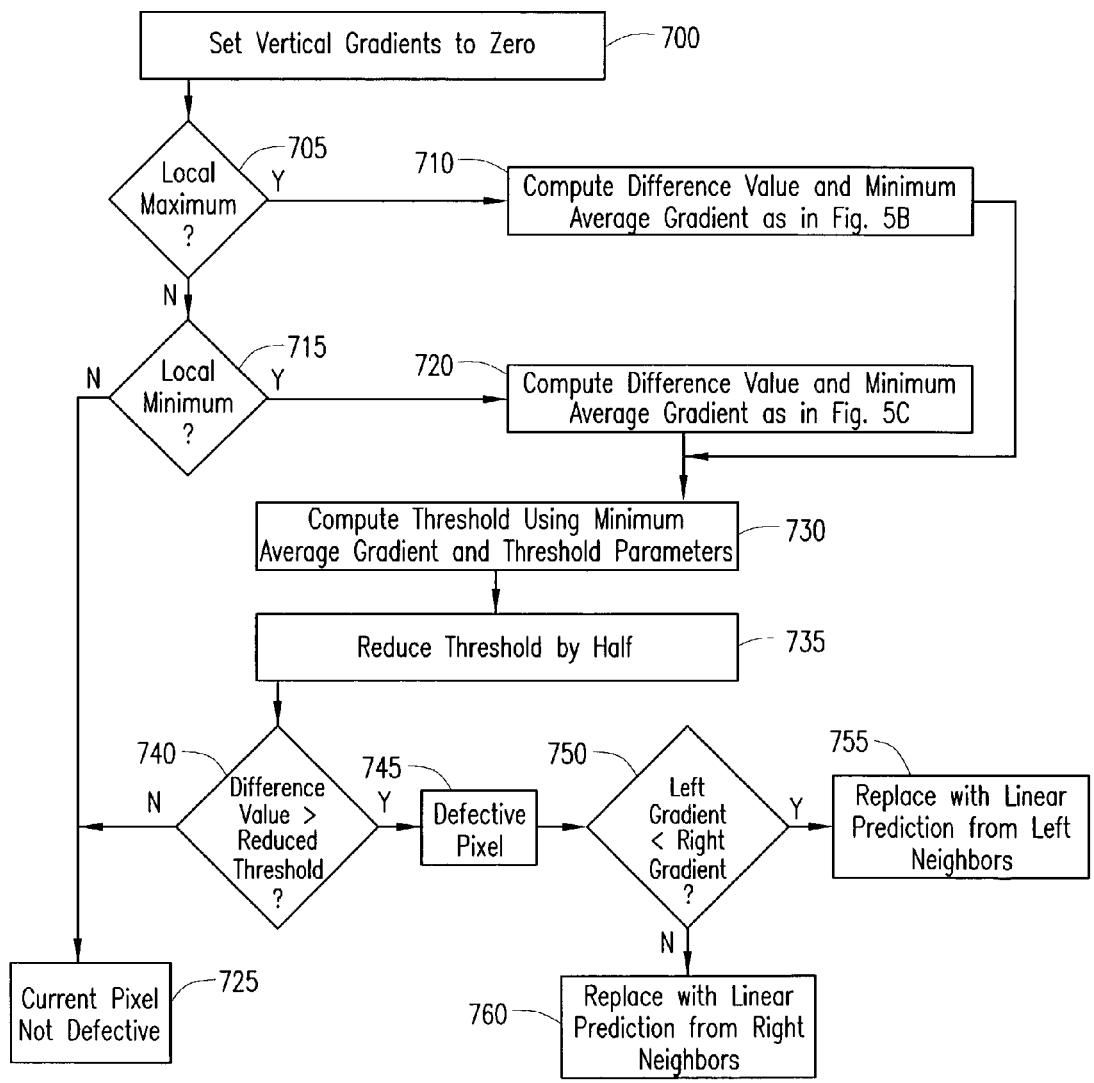
FIG. 7 is a flow chart illustrating exemplary steps for performing the BPC algorithm on the row of pixels shown in FIG. 6 in accordance with another embodiment of the present invention.

The row 28a of values 30 in FIG. 6 can be used to illustrate a sample implementation of the BPC algorithm shown in the exemplary steps of FIG. 7. Since there is only one row, the vertical and diagonal gradients cannot be calculated. Therefore, all of the vertical and diagonal gradients are set to zero (step 700). Again, the neighboring sensor values 30 in the same color plane (on the same row 28a) are sorted into ascending order to determine the maximum and the minimum, as described above with reference to FIG. 5A. For example, pixels X33 and X37 can be sorted into ascending order, so that either X33 or X37 is the maximum value and either X33 or X37 is the minimum value.

If the sensor value 35 of the current pixel ("Z") is above the maximum, the current sensor value 35 is a local maximum (step 705), and the difference value (d) and minimum average gradient (v) can be calculated, as shown in FIG. 5B (step 710). However, if the sensor value 35 of the current pixel ("Z") is below the minimum, the current sensor value 35 is a local minimum (step 715), and the difference value (d) and minimum average gradient (v) can be calculated, as shown in FIG. 5C (step 720). Otherwise, if the sensor value 35 of the current pixel ("Z") is neither above the maximum nor below the minimum, the current pixel ("Z") is not defective (step 725).

In either the local maximum or local minimum case, the difference value (d) and minimum average gradient (v) are calculated the same as described above with reference to FIGS. 5B and 5C, respectively, except that vertical gradients are not used in the computation or comparison. For example, to determine whether the current sensor value 35 is considered to be consistent with gradients in the same color plane, and therefore, the maximum value can be increased, only the gradients in the same row 28a are used. Thus, using FIG. 6, the maximum value is increased by the maximum of the gradients on either side of the current pixel ("Z") if:

$$(dColor(1) >= 0) \text{ AND } (dColor(4) <= 0).$$

If the current sensor value 35 is not consistent with gradients in the same color plane, the maximum value can also be increased based upon the gradients in other color planes, as shown in FIG. 5B. Once the maximum value is adjusted (depending on whether the current pixel lies on a local ridge), the difference value (d) and the smallest average absolute value of the gradients (v) on both sides of the current pixel ("Z") on the same row 28a can be computed, as shown in FIG. 5B. However, the smallest vertical gradient is not computed (as there is only one row used in the determination of whether the current pixel is defective). Similar changes to FIG. 5C are used for the local minimum case.

For either the local maximum or local minimum case, to determine whether the current pixel ("Z") is defective, the difference value (d) of the current pixel ("Z") is compared to a threshold amount calculated using the smallest average gradient (v) and one or more threshold parameters (step 730). Thus, as in FIG. 5B or 5C, the threshold amount can be expressed by the following equation:

threshold amount=($v$*scale_factor)+pedestal.

In the one-line embodiment, the threshold amount can be reduced by half (step 735), if the current sensor value 35 is a local maximum or local minimum and has the opposite gradient as the neighbors (i.e., the current sensor value is at a "crater"), such that there is a higher degree of confidence that the current pixel ("Z") is defective. Therefore, the current pixel ("Z") is considered to be defective in either the local maximum or local minimum case if the difference value (d) is greater than the reduced threshold amount (step 740), as illustrated by the following equation:

d>threshold amount/2.

An outlier distance can also be used in the one-line case (through not illustrated). If the current pixel ("Z") is determined to be defective (step 745), the sensor value 35 of the current pixel ("Z") is replaced with a value based upon neighboring sensor values 30. For example, if the left gradient has a higher value than the right gradient (step 750), the current sensor value 35 can be replaced with linear prediction from the left neighbors (step 755). Otherwise, the current sensor value 35 can be replaced with linear prediction from the right neighbors (step 760). Using FIG. 6, if:

abs($d$Color(1))<abs($d$Color(4)), then

Znew=2*X33−X31, else

Znew=2*X37−X39.

In another embodiment, instead of using the actual sensor values to form the range of sensor values, and modifying the maximum and/or minimum values using gradients in the same color plane or different color planes, the range of sensor values can be calculated directly from gradients of neighboring pixels in other color planes and from sensor values in different rows than the current pixel. For example, FIG. 8 illustrates sample raw sensor values 30 obtained from a 5×5 block of pixels 25 that can be used in embodiments of the BPC algorithm of the present invention.

Figure 8:
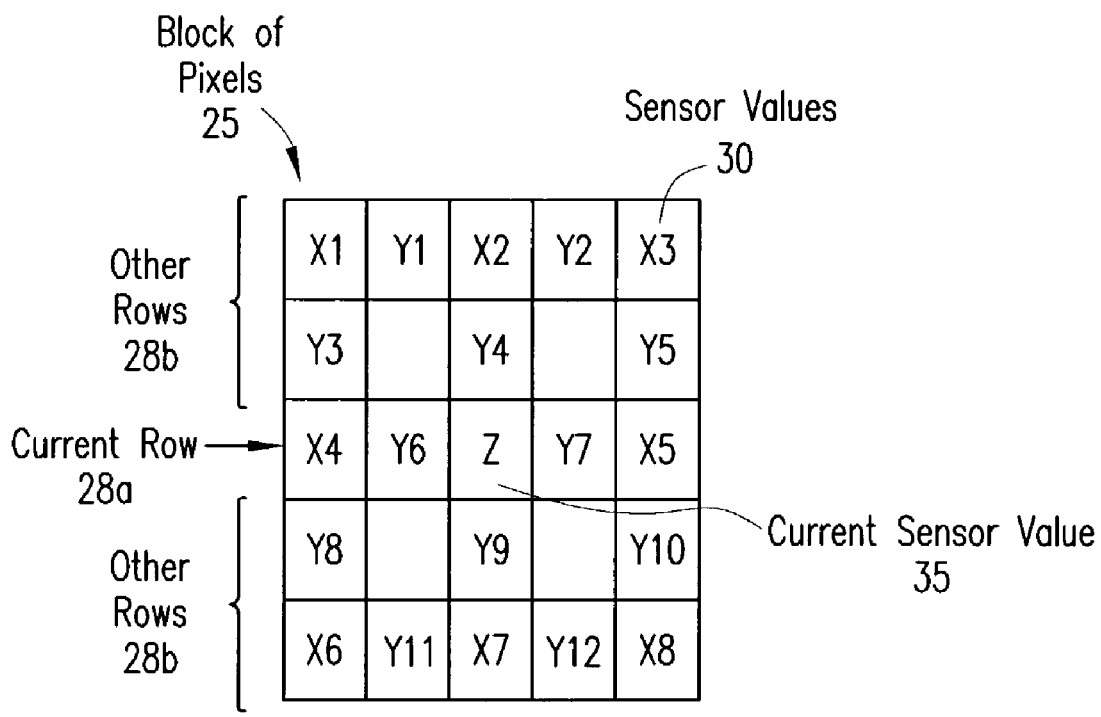
FIG. 8 illustrates sample raw sensor values obtained from a 5×5 block of pixels that can be used in embodiments of the BPC algorithm of the present invention.

As in FIGS. 4 and 6, the sensor value 35 in FIG. 8 of the current pixel under review is labeled "Z", the sensor values 30 obtained from pixels that are the same color as the current pixel are labeled "Xn", and the sensor values 30 obtained from pixels of different colors are labeled "Yn". Sensor values are not shown for those values that are not used in the determination of whether the current pixel is defective. The 5×5 block of pixels 25 shown in FIG. 8 enables vertical gradients from neighboring pixels in other rows 28b both above and below the current row 28a of current pixel "Z"to be used in the calculation of the range of sensor values. However, it should be understood that in other embodiments, only vertical gradients either above or below the current pixel ("Z") can be used, the former of which is illustrated in FIG. 9.

Figure 9:
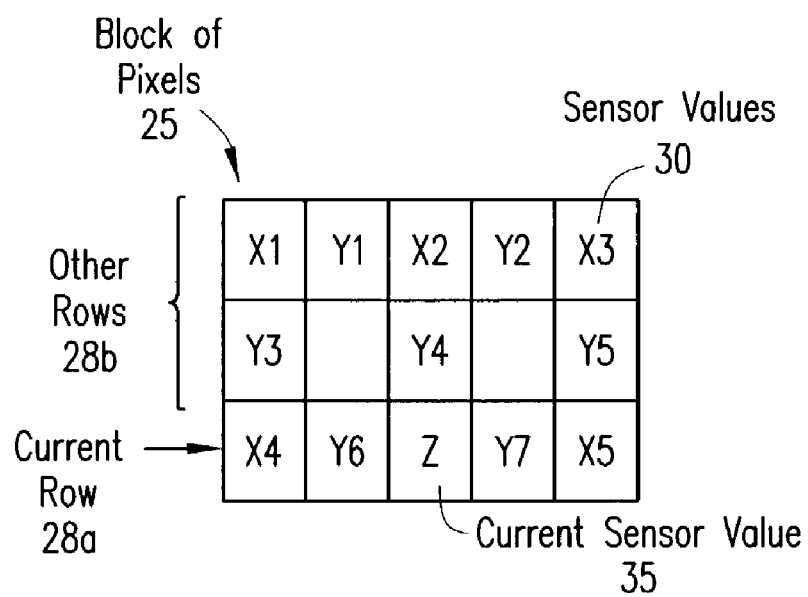
FIG. 9 illustrates sample raw sensor values obtained from a 3×5 block of pixels that can be used in embodiments of the BPC algorithm of the present invention.
Figure 10:
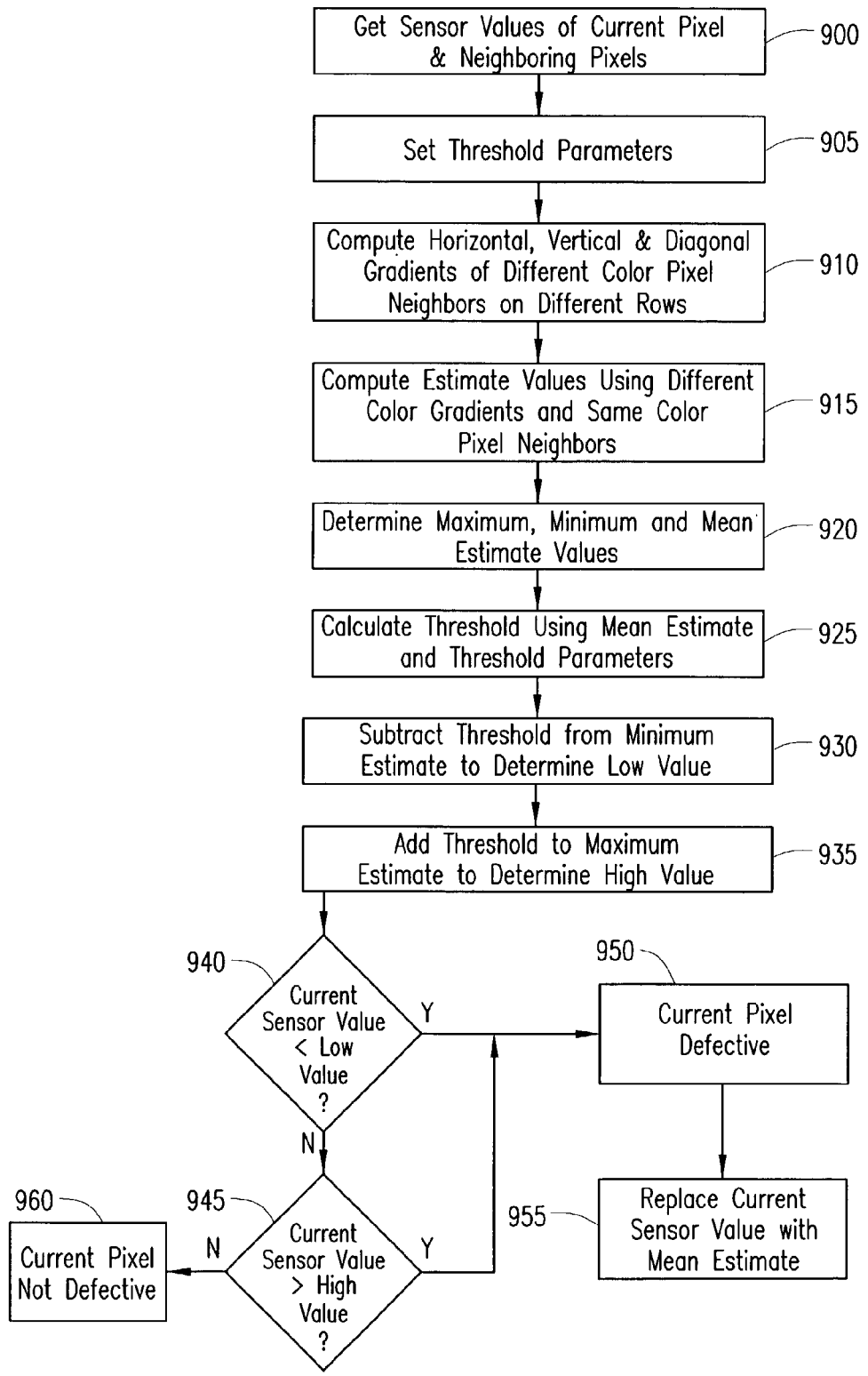
FIG. 10 is a flow chart illustrating exemplary steps for performing the BPC algorithm on the block of pixels shown in FIG. 8 or FIG. 9, in accordance with other embodiments of the present invention.

FIG. 10 is a flow chart illustrating exemplary steps for performing the BPC algorithm on either the 5×5 block of pixels 25 shown in FIG. 8 or the 3×5 block of pixels 25 shown in FIG. 9, in accordance with other embodiments of the present invention. After retrieving the requisite number of neighboring sensor values 30 from the buffer for analyzing the sensor value 35 of the current pixel ("Z") (step 900), one or more threshold parameters can be set (step 905) to reduce the number of false defective pixel detections. For example, the threshold parameters can include both the scale factor and the pedestal, discussed above in connection with FIGS. 5 and 7.

From the retrieved neighboring sensor values, horizontal, vertical and diagonal gradients are computed from different color pixel neighbors on the current row and adjacent rows (step 910). The horizontal, vertical and diagonal gradients are used to compute estimated values of the current pixel ("Z") from each of the same color pixel neighbors (step 915), using a Taylor series function (i.e., the current sensor value 35 can be estimated from neighboring sensor values 30 based on the slope of the function defining the neighboring sensor values 30). The estimated values form the range of sensor values expected for the current pixel. For example, using the 5×5 block of pixels 25 in FIG. 8, the estimated values can include:

$E1$=Estimate $(X2)$=$(((Y6-Y1)+(Y7-Y2))/2)+X2$ $E2$=Estimate $(X7)$=$(((Y6-Y11)+(Y7-Y12))/2)+X7$ $E3$=Estimate $(X4)$=$(((Y4-Y3)+(Y9-Y8))/2)+X4$ $E4$=Estimate $(X5)$=$(((Y4-Y5)+(Y9-Y10))/2)+X5$ $E5$=Estimate $(X1)$=$(((Y7-Y1)+(Y9-Y3))/2)+X1$ $E6$=Estimate $(X3)$=$(((Y6-Y2)+(Y9-Y5))/2)+X3$ $E7$=Estimate $(X6)$=$(((Y4-Y8)+(Y7-Y11))/2)+X6$ $E8$=Estimate $(X8)$=$(((Y6-Y12)+(Y4-Y10))/2)+X8$.

As another example, using the 3×5 block of pixels 25 in FIG. 9, the estimated values can include:

$E1$=Estimate $(X2)$=$(Y6-Y1)+X2$ $E2$=Estimate $(X2)$=$(Y7-Y2)+X2$ $E3$=Estimate $(X4)$=$(Y4-Y3)+X4$ $E4$=Estimate $(X4)$=$(Y7-Y6)+X4$ $E5$=Estimate $(X5)$=$(Y4-Y5)+X5$ $E6$=Estimate $(X5)$=$(Y6-Y7)+X5$ $E7$=Estimate $(X1)$=$(Y7-Y1)+X1$ $E8$=Estimate $(X3)$=$(Y6-Y2)+X3$.

As can be seen, the gradients are computed using pixels located within a two pixel radius to the current pixel ("Z"). In comparison to the embodiments shown in FIGS. 4-7, the gradients in the embodiments shown in FIGS. 8-10 are calculated from a narrower neighborhood (i.e., closer to the current pixel under review), which results in an improved estimate of the expected range of sensor values for the current pixel ("Z"). Therefore, the usage of closer gradients increases the detectability of defective pixels and provides a more accurate replacement value for defective pixels.

The maximum and minimum sensor values from the range of sensor values for the current pixel can be formulated by sorting the estimated values calculated above into ascending order and determining the maximum estimate and minimum estimate. In addition, a mean estimate can also be calculated from the estimated values for use in determining whether the current pixel is defective (step 920). For example, the maximum, minimum and mean sensor values can be represented as:

minimum=minimum($E1 \ldots E8$);

mean=mean($E1 \ldots E8$);

maximum=maximum($E1 \ldots E8$);

If the sensor value of the current pixel is less than the minimum estimate or greater than the maximum estimate by more than a threshold amount calculated using the mean estimate, the current pixel is determined to be a defective pixel. To compute the threshold amount, the mean estimate is modified using the threshold parameters established above (step 925). For example, the threshold amount can be calculated using the following equation:

threshold amount=$E$mean*scale factor+pedestal.

As in other embodiments, the threshold parameters (scale factor and pedestal) are chosen to optimize the ratio of defective pixel detection to true pixel detection. The threshold parameters can be fixed and/or variable depending upon the sensor value, the CFA employed, the type of sensor, etc. Exemplary numbers for the scale factor and pedestal in this embodiment are: scale factor of 0.1 and pedestal of 6. The threshold amount is subtracted from the minimum estimate to determine a low value (step 930) and added to the maximum estimate to determine a high value (step 935). The current pixel is determined to be defective if:

$X$<($E$min−threshold) OR $X$>($E$max+threshold).

Therefore, if the current sensor value is less than the low value (step 940) or the current sensor value is greater than the high value (step 945), the current pixel ("Z") is considered defective (step 950). Otherwise, the current pixel ("Z") is not defective (step 960).

For each defective pixel detected, the sensor value 35 of the defective pixel ("Z") is replaced using the sensor values 30 of the neighboring pixels (step 955). For example, since the mean estimate for the pixel ("Z") has already been calculated, the mean estimate can be used as the replacement value for the current pixel ("Z"). However, it should be understood that other replacement values for ("Z") can be used, such as the median value of the surrounding sensor values 30, a bilinear value or a nearest neighbor value.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A digital image sensor for detecting and correcting sensor values from defective pixels in an image, comprising:
   an array of pixels arranged in rows and columns, each of said pixels in said array of pixels producing a respective sensor value for an image;
   a buffer for storing at least part of said sensor values produced by at least one of said rows of said pixels for said image, one of said sensor values being a current sensor value in a first color plane produced by a current one of said pixels; and
   a processor connected: (1) to receive said sensor values stored in said buffer, (2) to compute one or more gradients from said sensor values in at least a second color plane and (3) to calculate a range of values corresponding to said current pixel based on said sensor values produced by neighboring ones of said pixels in said first color plane and a threshold amount using said one or more gradients and said range of values, the range of values including at least a maximum range value and a minimum range value,
   wherein the processor determines whether said current pixel is defective responsive to the current pixel value being one of: (i) greater than said maximum range value of the range of values by more than said threshold amount or (ii) less than said minimum range value of the range of values by more than said threshold amount.

2. The sensor of claim 1, wherein said processor replaces said current sensor value with a replacement value calculated using said sensor values produced by said neighboring pixels.

3. The sensor of claim 2, wherein said range of values includes a maximum sensor value, as the maximum range value, from said sensor values produced by said neighboring pixels and a minimum sensor value, as a minimum range value, from said sensor values produced by said neighboring pixels, said current pixel being determined to be defective responsive to an absolute value of a difference between said current sensor value and either said maximum range value or said minimum range value exceeding said threshold amount.

4. The sensor of claim 3, wherein said replacement value is a median value of said sensor values produced by said neighboring pixels.

5. The sensor of claim 3, wherein said maximum range value is increased by a maximum of one or more same color gradients computed from said neighboring pixels and said minimum range value is decreased by a minimum of said one or more same color gradients when said current sensor value is consistent with said one or more same color gradients.

6. The sensor of claim 5, wherein said one or more same color gradients includes one or more current row same color gradients computed from said neighboring pixels in a current one of said rows including said current pixel.

7. The sensor of claim 6, wherein said one or more same color gradients further includes one or more vertical same color gradients computed from said neighboring pixels in said current row and one or more additional ones of said rows above or below said current row, said maximum range value being increased by a maximum of said current row same color gradients and said minimum range value being decreased by a minimum of said current row same color gradients.

8. The sensor of claim 3, wherein said maximum range value is increased by a maximum of said one or more gradients computed from additional neighboring ones of said pixels in said second color plane within a current one of said rows including said current pixel and said minimum range value is decreased by a minimum of said one or more gradients computed from said additional neighboring pixels when said current sensor value is consistent with said one or more gradients.

9. The sensor of claim 3, wherein said processor further calculates a minimum average gradient using said one or more gradients, said threshold amount being calculated using said minimum average gradient and one or more threshold parameters.

10. The sensor of claim 9, wherein said minimum average gradient is a minimum of an absolute value of an average of said one or more gradients in said first color plane and said second plane on a first side of said current pixel and an absolute value of an average of said one or more gradients in said first color plane and said second color plane on a second side of said current pixel.

11. The sensor of claim 9, wherein said one or more threshold parameters include a scale factor multiplied by said minimum average gradient and a pedestal added to a product of said minimum average gradient and said scale factor.

12. The sensor of claim 9, wherein said processor further calculates a minimum vertical gradient from one or more vertical gradients computed from respective neighboring ones of said pixels to said current pixel in said first color plane in different ones of said rows than said current pixel.

13. The sensor of claim 12, wherein said processor determines that said current pixel is defective when said difference exceeds said threshold amount and said minimum vertical gradient exceeds said threshold amount.

14. The sensor of claim 3, wherein said processor further determines that said current pixel is defective when said current sensor value exceeds said maximum range value by more than a threshold parameter.

15. The sensor of claim 2, wherein said range of values includes a maximum estimate, a minimum estimate and a mean estimate calculated using said one or more gradients, said threshold amount being calculated using said mean estimate and one or more threshold parameters, said current pixel being defective when said current sensor value is greater than said maximum estimate or less than said minimum estimate by more than said threshold amount.

16. The sensor of claim 15, wherein said replacement value is said mean estimate.

17. The sensor of claim 15, wherein said range of values includes eight estimates, said maximum estimate being a maximum of said eight estimates, said minimum estimate being a minimum of said eight estimates and said mean estimate being a mean of said eight estimates, each of said eight estimates being calculated by adding said sensor value from a surrounding one of said pixels in said first color plane to said one or more gradients in at least said second color plane in a direction of said added sensor value.

18. A method for detecting defective pixels, comprising:
   storing sensor values produced by at least part of one row of pixels in a sensor for an image, one of said sensor values being a current sensor value in a first color plane produced by a current one of said pixels;
   computing one or more gradients from said sensor values in at least a second color plane;
   calculating a range of values corresponding to said current pixel based on said sensor values produced by neighboring ones of said pixels in said first color plane;
   calculating said threshold amount using said one or more gradients; and
   determining whether said current pixel is defective responsive to the current pixel value being one of: (i) greater than a maximum range value of the range of values by more than said threshold or (ii) less than a minimum range value of the range of values by more than said threshold amount.

19. The method of claim 18, further comprising:
   replacing said current sensor value with a replacement value calculated using said sensor values produced by said neighboring pixels.

20. The method of claim 19, wherein said range of values includes a maximum sensor value, as the maximum range value, and a minimum sensor value, as the minimum range value, from said sensor values produced by said neighboring pixels, said step of determining further comprising:
   determining that said current pixel is defective responsive to an absolute value of a difference between said current sensor value and either said maximum range value or said minimum range value exceeding said threshold amount.

21. The method of claim 20, wherein said step of replacing further comprises:
   calculating a median value of said sensor values produced by said neighboring pixels; and
   using said median value as said replacement value.

22. The method of claim 20, wherein said step of calculating said range of values further comprises:
   increasing said maximum range value by a maximum of one or more same color gradients computed from said neighboring pixels when said current sensor value is consistent with said one or more same color gradients; and
   decreasing said minimum range value by a minimum of said one or more same color gradients when said current sensor value is consistent with said one or more same color gradients.

23. The method of claim 22, wherein said step of calculating said range of values further comprises:
   computing said one or more same color gradients from said neighboring pixels in a current one of said rows including said current pixel.

24. The method of claim 23, wherein said step of calculating said range of values further comprises:
   computing said one or more same color gradients from said neighboring pixels in said current row and one or more additional ones of said rows above or below said current row.

25. The method of claim 20, wherein said step of calculating said range of values further comprises:
   increasing said maximum range value by a maximum of said one or more gradients computed from additional neighboring ones of said pixels in said second color plane within a current one of said rows including said current pixel when said current sensor value is consistent with said one or more gradients; and
   decreasing said minimum range value by a minimum of said one or more gradients computed from said additional neighboring pixels when said current sensor value is consistent with said one or more gradients.

26. The method of claim 20, wherein said step of calculating said threshold amount further comprises:
   calculating a minimum average gradient using said one or more gradients; and
   calculating said threshold amount using said minimum average gradient and one or more threshold parameters.

27. The method of claim 26, wherein said step of calculating said minimum average gradient further comprises:
   determining a minimum of a absolute value of an average of said one or more gradients in said first color plane and said second plane on a first side of said current pixel and an absolute value of a average of said one or more gradients in said first color plane and said second color plane on a second side of said current pixel.

28. The method of claim 26, wherein the one or more threshold parameters include a scale factor and a pedestal, and wherein said step of calculating said threshold amount further comprises:
- multiplying said scale factor by said minimum average gradient; and
- adding said pedestal to a product of said minimum average gradient and said scale factor.

29. The method of claim 26, wherein said step of determining that said current pixel is defective further comprises:
- calculating a minimum vertical gradient from one or more vertical gradients computed from respective neighboring ones of said pixels to said current pixel in said first color plane in different ones of said rows than said current pixel; and
- determining that said current pixel is defective when said difference exceeds said threshold amount and said minimum vertical gradient exceeds said threshold amount.

30. The method of claim 20, wherein said step of determining that said current pixel is defective further comprises:
- determining that said current pixel is defective when said current sensor value exceeds said maximum range value by more than a threshold parameter.

31. The method of claim 19, wherein said range of values includes a maximum estimate, a minimum estimate and a mean estimate calculated using said one or more gradients, said threshold amount being calculated using said mean estimate and one or more threshold parameters, said step of determining further comprising:
- determining that said current pixel is defective when said current sensor value is greater than said maximum estimate or less than said minimum estimate by more than said threshold amount.

32. The method of claim 31, wherein said step of replacing further comprises: replacing said current sensor value with said mean estimate.

33. The method of claim 31, wherein said range of values includes eight estimates, said maximum estimate being a maximum of said eight estimates, said minimum estimate being a minimum of said eight estimates and said mean estimate being a mean of said eight estimates, said step of calculating said range of values further comprising: calculating each of said eight estimates by adding said sensor value from a surrounding one of said pixels in said first color plane to said one or more gradients in said second color plane in a direction of said added sensor value.

* * * * *

UNITED STATES PATENT AND TRADEMARK OFFICE
CERTIFICATE OF CORRECTION

PATENT NO. : 7,283,164 B2  Page 1 of 1
APPLICATION NO. : 10/246124
DATED : October 16, 2007
INVENTOR(S) : Kakarala et al.

It is certified that error appears in the above-identified patent and that said Letters Patent is hereby corrected as shown below:

In column 20, line 62, in Claim 27, after "of" delete "a" and insert -- the --, therefor.

In column 20, line 65, in Claim 27, delete "a" and insert -- the --, therefor.

Signed and Sealed this

First Day of April, 2008

JON W. DUDAS
*Director of the United States Patent and Trademark Office*